United States Patent
Aoai et al.

(10) Patent No.: US 9,789,720 B2
(45) Date of Patent: *Oct. 17, 2017

(54) IMAGE FORMING METHOD, IMAGE FORMING APPARATUS, AND RECORDED MATTER

(71) Applicant: RICOH COMPANY, LTD., Ohta-ku (JP)

(72) Inventors: Shosuke Aoai, Kanagawa (JP); Tsutomu Maekawa, Kanagawa (JP); Michihiko Namba, Kanagawa (JP); Shinya Seno, Kanagawa (JP); Hiroshi Gotou, Shizuoka (JP); Akihiko Gotoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 14/412,114

(22) PCT Filed: Jul. 5, 2013

(86) PCT No.: PCT/JP2013/069072
§ 371 (c)(1),
(2) Date: Dec. 30, 2014

(87) PCT Pub. No.: WO2014/010710
PCT Pub. Date: Jan. 16, 2014

(65) Prior Publication Data
US 2015/0283828 A1   Oct. 8, 2015

(30) Foreign Application Priority Data
Jul. 11, 2012  (JP) .................................. 2012-155193

(51) Int. Cl.
*B41M 5/00*  (2006.01)
*C09D 11/322*  (2014.01)
(Continued)

(52) U.S. Cl.
CPC ........ *B41M 5/0017* (2013.01); *B41J 11/0015* (2013.01); *C09D 11/322* (2013.01);
(Continued)

(58) Field of Classification Search
None
See application file for complete search history.

(56) References Cited

U.S. PATENT DOCUMENTS 6,106,602 A   8/2000   Ouchi et al.
7,699,457 B2  4/2010   Namba et al.
(Continued)

FOREIGN PATENT DOCUMENTS

EP   2 467 262   6/2012
JP   3206797     7/2001
(Continued)

OTHER PUBLICATIONS

Russian Office Action dated Apr. 26, 2016 in Patent Application No. 2015104348 (with English Translation).
(Continued)

*Primary Examiner* — Michael P Rodriguez
(74) *Attorney, Agent, or Firm* — Oblon, McClelland, Maier & Neustadt, L.L.P.

(57) ABSTRACT

To provide an image forming method, including applying a pre-treatment liquid on a recording medium including a substrate and a coating layer at least on one surface of the substrate, wherein the pre-treatment liquid is applied on a surface of the recording layer with the coating layer; drying the recording medium on which the pre-treatment liquid has been applied; and forming an image on the recording medium after drying by discharging a water-based ink by inkjet method, wherein the pre-treatment liquid includes a water-soluble cationic polymer, an ammonium salt of an organic acid and water, and wherein the water-based ink
(Continued)

includes water and negatively charged colored particles including a colorant.

13 Claims, 1 Drawing Sheet

(51) Int. Cl.
 C09D 11/54 (2014.01)
 B41J 11/00 (2006.01)
(52) U.S. Cl.
 CPC ............ *C09D 11/54* (2013.01); *B41M 5/0023* (2013.01); *Y10T 428/24901* (2015.01)

(56) References Cited

U.S. PATENT DOCUMENTS

| | | | |
|---|---|---|---|
| 7,892,340 B2 | 2/2011 | Namba et al. | |
| 7,919,544 B2 | 4/2011 | Matsuyama et al. | |
| 8,029,122 B2 | 10/2011 | Kojima et al. | |
| 8,044,114 B2 | 10/2011 | Habashi et al. | |
| 8,096,651 B2 | 1/2012 | Ohshima et al. | |
| 8,109,622 B2 | 2/2012 | Goto et al. | |
| 8,173,227 B2 | 5/2012 | Morohoshi et al. | |
| 8,192,009 B2 | 6/2012 | Yokohama et al. | |
| 8,240,836 B2 | 8/2012 | Morohoshi et al. | |
| 8,242,201 B2 | 8/2012 | Goto et al. | |
| 8,252,207 B2 | 8/2012 | Namba et al. | |
| 8,304,043 B2 | 11/2012 | Nagashima et al. | |
| 8,353,582 B2 | 1/2013 | Habashi et al. | |
| 9,068,090 B2 * | 6/2015 | Gotou ............... B41J 2/2107 | |
| 2008/0233363 A1 | 9/2008 | Goto | |
| 2008/0302268 A1 | 12/2008 | Arita et al. | |
| 2009/0135218 A1 | 5/2009 | Morohoshi et al. | |
| 2009/0263632 A1 | 10/2009 | Kojima et al. | |
| 2010/0020142 A1 | 1/2010 | Bannai et al. | |
| 2010/0196601 A1 | 8/2010 | Goto et al. | |
| 2010/0196602 A1 | 8/2010 | Koyano et al. | |
| 2010/0271435 A1 | 10/2010 | Kojima et al. | |
| 2010/0279035 A1 | 11/2010 | Namba et al. | |
| 2010/0295891 A1 | 11/2010 | Goto et al. | |
| 2011/0057981 A1 | 3/2011 | Aruga et al. | |
| 2011/0164086 A1 | 7/2011 | Goto et al. | |
| 2011/0169889 A1 | 7/2011 | Kojima et al. | |
| 2011/0205288 A1 | 8/2011 | Matsuyama et al. | |
| 2011/0216123 A1 | 9/2011 | Tamai et al. | |
| 2011/0227994 A1 | 9/2011 | Yanagi | |
| 2011/0234679 A1 * | 9/2011 | Saito ............... C08G 65/24 347/20 |
| 2011/0298876 A1 | 12/2011 | Takeuchi et al. | |
| 2011/0300353 A1 | 12/2011 | Habashi et al. | |
| 2011/0310166 A1 | 12/2011 | Namba et al. | |
| 2012/0044293 A1 | 2/2012 | Morohoshi et al. | |
| 2012/0086762 A1 | 4/2012 | Noguchi et al. | |
| 2012/0098883 A1 | 4/2012 | Matsuyama et al. | |
| 2012/0128949 A1* | 5/2012 | Goto ............... B41M 5/0017 428/207 |
| 2012/0147103 A1 | 6/2012 | Hasegawa et al. | |
| 2012/0176456 A1 | 7/2012 | Maekawa et al. | |
| 2012/0200648 A1 | 8/2012 | Hiraoka et al. | |
| 2012/0207983 A1 | 8/2012 | Matsuyama et al. | |
| 2012/0236066 A1 | 9/2012 | Tamai et al. | |
| 2012/0242768 A1 | 9/2012 | Seno et al. | |
| 2012/0293582 A1 | 11/2012 | Goto et al. | |
| 2012/0293589 A1 | 11/2012 | Hiraoka | |
| 2012/0320133 A1 | 12/2012 | Namba et al. | |
| 2012/0320137 A1 | 12/2012 | Fujii et al. | |
| 2013/0002776 A1 | 1/2013 | Nagashima et al. | |
| 2013/0063524 A1 | 3/2013 | Katoh et al. | |
| 2013/0065024 A1 | 3/2013 | Aruga et al. | |
| 2013/0065028 A1 | 3/2013 | Fujii et al. | |
| 2013/0070017 A1 | 3/2013 | Fujii et al. | |
| 2013/0071637 A1 | 3/2013 | Matsuyama et al. | |
| 2013/0101814 A1 | 4/2013 | Gotou et al. | |
| 2013/0113860 A1 | 5/2013 | Gotou et al. | |
| 2013/0143008 A1 | 6/2013 | Gotou et al. | |
| 2013/0155145 A1 | 6/2013 | Gotou et al. | |
| 2013/0169724 A1 | 7/2013 | Gotou | |
| 2013/0176369 A1 | 7/2013 | Gotou et al. | |
| 2013/0194343 A1 | 8/2013 | Yokohama et al. | |
| 2013/0194344 A1 | 8/2013 | Yokohama et al. | |
| 2013/0194345 A1 | 8/2013 | Tamai et al. | |
| 2013/0197144 A1 | 8/2013 | Katoh et al. | |
| 2013/0201252 A1 | 8/2013 | Namba | |

FOREIGN PATENT DOCUMENTS

| | | |
|---|---|---|
| JP | 2004-090596 | 3/2004 |
| JP | 2011-063016 | 3/2011 |
| JP | 2011063016 A * | 3/2011 |
| JP | 2011-194613 | 10/2011 |
| JP | 2012-011567 | 1/2012 |
| JP | 2012-040778 | 3/2012 |
| JP | 2012-091505 | 5/2012 |
| WO | WO 2009/091079 A1 | 7/2009 |
| WO | WO 2011/021591 A1 | 2/2011 |
| WO | WO 2012/002198 A1 | 1/2012 |

OTHER PUBLICATIONS

Extended European Search Report dated Jul. 29, 2015 in Patent Application No. 13817634.2.
International Search Report dated Sep. 17, 2013 for counterpart International Patent Application No. PCT/JP2013/069072 filed Jul. 5, 2013.
U.S. Appl. No. 13/205,837, filed Aug. 9, 2011.
Office Action dated Nov. 26, 2015 in Japanese Patent Application No. 2012-155193 (with partial English language translation).

* cited by examiner

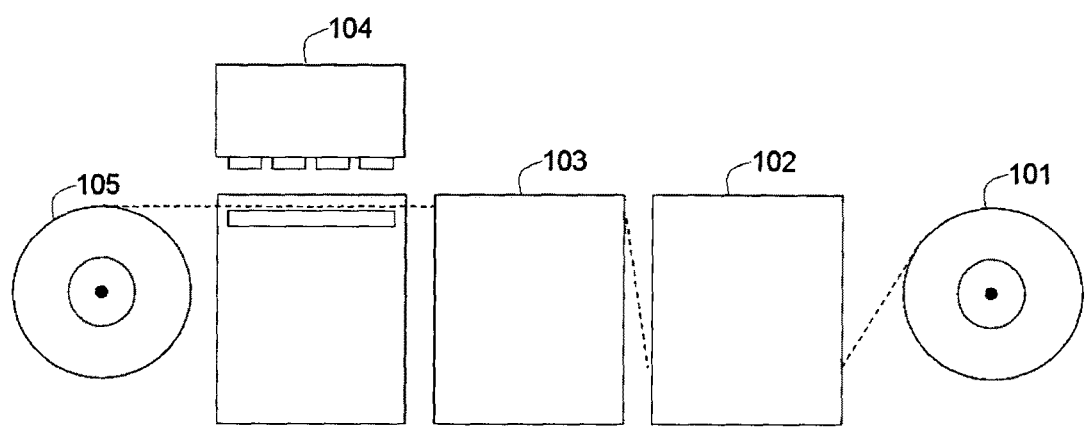

IMAGE FORMING METHOD, IMAGE FORMING APPARATUS, AND RECORDED MATTER

TECHNICAL FIELD

The present invention relates to an image forming method, an image forming apparatus and a recorded matter using a water-based ink and a pre-treatment liquid.

BACKGROUND ART

In recent years, a recording medium including a coating layer used as offset printing paper has been employed in an image forming method by water-based inkjet. However, unlike a recording medium without a coating layer, inks hardly penetrate the recording medium including a coating layer. Thus, coalescence of droplets occurs on paper, and there is a problem of bleeding between inks of different colors or between the inks and the recording medium.

In order to solve the problem, in a case where a water-based ink is discharged on a recording medium including a coating layer, there is proposed a method for preventing bleeding by promoting agglomeration of a pigment in the water-based ink.

Specifically, in the method, a recording medium designated for water-based inkjet image formation is prepared and used by treating a recording medium including a coating layer so as to impart pigment agglomeration promoting function. However, this method has a problem of that the recording medium is limited.

Meanwhile, for a recording medium without a coating layer such as plain paper, a method of applying a pre-treatment liquid which agglomerates a pigment in an ink immediately before ink discharge is proposed.

For example, there is proposed an inkjet recording method to apply on plain paper a reaction liquid including polyallylamine and an ink composition including a colorant and a resin emulsion for printing (see PTL 1).

Also, there is proposed an inkjet recording method to apply on plain paper a reaction liquid including an ammonium salt of an organic acid and a water-soluble cationic polymer and an ink composition including a colorant and a resin emulsion for printing (see PTL 2). These proposals are directed to plain paper including no coating layer as the recording medium. When the recording methods by these proposals are applied to a case where a recording medium including a coating layer is used and a large quantity of a pre-treatment liquid is used, e.g. high-speed continuous printer, there are risks of occurrence of a failure in a conveying member of the apparatus and degradation of image quality due to accumulation of contamination. That is, when the treatment liquid is applied, the pre-treatment liquid contacts with the conveying member before an inkjet discharge step, causing the pre-treatment liquid transferred to the conveying member. Thus, there arise problems of occurrence of a failure in the conveying member and degradation of image quality due to accumulation of contamination.

In order to solve the problem, an image forming method including a drying step for drying a treatment liquid has been studied, where the treatment liquid is dried quickly after it is applied. The image forming method including the drying step can solve the problem of the pre-treatment liquid transferred to the conveying member. However, an agglomeration function of the treatment liquid degrades through the drying step. As a result, there arises a new problem of degraded image quality due to degraded function of bleeding prevention.

CITATION LIST

Patent Literature

[PTL 1] Japanese Patent (JP-B) No. 3206797
[PTL 2] Japanese Patent Application Laid-Open (JP-A) No. 2012-40778

SUMMARY OF INVENTION

Technical Problem

The present invention aims at providing an image forming method which enables image formation having favorable image quality without bleeding while suppressing decrease in agglomeration of a pigment in an ink.

Solution to Problem

As a means for solving the above problems, an image forming method of the present invention includes:
a pre-treatment liquid application step for applying a pre-treatment liquid on a recording medium including a substrate and a coating layer disposed at least on one surface of the substrate, wherein the pre-treatment liquid is applied on a surface of the recording medium with the coating layer;
a drying step for drying the recording medium on which the pre-treatment liquid has been applied; and
an image forming step for forming an image on the recording medium after drying by discharging a water-based ink by inkjet method,
wherein the pre-treatment liquid includes a water-soluble cationic polymer, an ammonium salt of an organic acid and water, and
wherein the water-based ink includes water and negatively charged colored particles including a colorant.

Advantageous Effects of Invention

The present invention can provide an image forming method which enables image formation having favorable image quality while suppressing decrease in agglomeration of a pigment in an ink.

BRIEF DESCRIPTION OF DRAWINGS

FIG. 1 is a schematic configuration diagram illustrating one example of an image forming apparatus used in an image forming method of the present invention.

DESCRIPTION OF EMBODIMENTS (Image Forming Method)
An image forming method of the present invention includes a pre-treatment liquid application step, a drying step and an image forming step, and it further includes other steps according to necessity.

The present inventors have found that the problems may be solved by: applying a pre-treatment liquid including a water-soluble cationic polymer, an ammonium salt of an organic acid and water, which has been used as a pre-treatment liquid for a recording medium without a coating layer (plain paper), on a recording medium including a coating layer as a pre-treatment liquid; drying the pre-treatment liquid; and then applying an ink.

<Pre-Treatment Liquid Application Step>

The pre-treatment liquid application step is a step for applying a pre-treatment liquid on a surface of a recording medium including a coating layer, wherein the recording medium includes the coating layer on at least one surface of a substrate.

A method for applying the pre-treatment liquid is not particularly restricted as long as the pre-treatment liquid can be uniformly applied on the surface of the recording medium, and it may be appropriately selected according to purpose. Examples thereof include a blade coating method, a gravure coating method, a gravure offset coating method, a bar coating method, a roll coating method, a knife coating method, an air knife coating method, a comma coating method, an U comma coating method, an AKKU coating method, a smoothing coating method, a micro-gravure coating method, a reverse roll coating method, a four-roll or five-roll coating method, a dip coating method, a curtain coating method, a slide coating method and a die coating method.

A wet coating amount of the pre-treatment liquid on the recording medium (a coating amount of the pre-treatment liquid before drying the recording medium) is preferably 0.1 g/m² to 10.0 g/m², and more preferably 1.0 g/m² to 3.0 g/m².

The wet coating amount of 0.1 g/m² or greater improves image quality of a recorded matter (concentration, color saturation, color bleed, feathering). The amount of 10.0 g/m² or less provides the same agglomeration effect as in the case exceeding 10.0 g/m² may be achieved. In addition, it does not sacrifice the texture of the recorded matter, saves time for the drying step and causes no problem in terms of cost.

<<Recording Medium>>

The recording medium is not particularly restricted as long as it is printing paper including the coating layer at least on one surface of the substrate, and it may be appropriately selected according to purpose.

The printing paper including the coating layer is paper with enhanced appearance and smoothness by applying a coating on a surface of a base paper, and the coating may be on both sides or on one side thereof. Examples of the coating include a mixture of a white pigment such as kaolin and calcium carbonate with a binder such as starch.

Examples of types of the printing paper including the coating layer include art paper, coated paper, lightweight coated paper, cast paper and fine coated paper.

In the present invention, the recording medium includes the substrate and the coating layer disposed at least on one surface of the substrate, and the pre-treatment liquid is applied on a surface of the recording medium with the coating layer.

<<Pre-Treatment Liquid>>

The pre-treatment liquid includes a water-soluble cationic polymer, ammonium salt of an organic acid and water, and it further includes other components according to necessity.

Both the water-soluble cationic polymer and the ammonium salt of an organic acid have a function as an agglomerating agent for agglomerating a pigment in a water-based ink.

—Water-Soluble Cationic Polymer—

The water-soluble cationic polymer is not particularly restricted, and heretofore known ones may be used. Nonetheless, the water-soluble cationic polymer is obtained preferably by polymerization of an amine monomer and epihalohydrin.

The water-soluble cationic polymer obtained by polymerization of these monomers includes a hydroxyl group and an ammonium cation in a main chain thereof. Also, it is considered that a halogen anion released in an aqueous solution has functions of enhancing a buffering effect in case of contacting with an ink and an effect of agglomerating a pigment.

Examples of the cationic polymer include a polyamine-epihalohydrin copolymer, a polyamide-epihalohydrin copolymer, a polyamidepolyamine-epihalohydrin copolymer and an amine-epihalohydrin copolymer. Among these, favorably used is a copolymer represented by General Formula (A) below, a copolymer including a repeating unit represented by General Formula (B) below or a copolymer obtained by polymerization of an amine monomer, a monomer represented by Structural Formula (C) below and a monomer represented by General Formula (D) below, or any combination thereof.

<General Formula (A)>

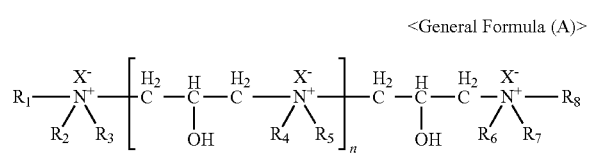

where, in General Formula (A), $R_1$ to $R_8$ represent any one of an alkyl group, a hydroxyalkyl group, an alkenyl group and a benzyl group; X represents a halogen atom; n represents an integer of 1 or 2.

The alkyl group in $R_1$ to $R_8$ preferably contains 1 to 8 carbon atoms, and examples thereof include a methyl group, an ethyl group, a propyl group and a butyl group.

Examples of the hydroxyalkyl group in $R_1$ to $R_8$ include the alkyl group with hydrogen atoms are partially substituted by hydroxyl groups.

Examples of the alkenyl group in $R_1$ to $R_8$ include a vinyl group, an allyl group, a butenyl group, a hexenyl group and a decenyl group.

Examples of the halogen atom represented by X include a fluorine atom, a chlorine atom, a bromine atom and an iodine atom.

<General Formula (B)>

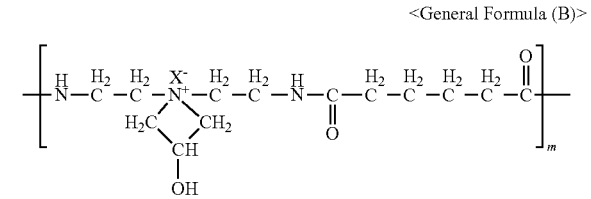

where, in General Formula (B), X represents a halogen atom; m represents an integer of 1 or greater.

Examples of the halogen atom represented by X in General Formula (B) include a fluorine atom, a chlorine atom, a bromine atom and an iodine atom.

<Structural Formula (C)>

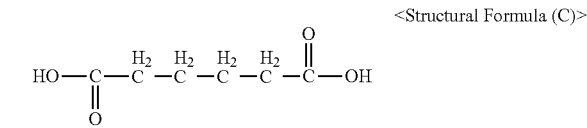

<General Formula (D)>

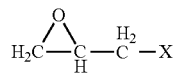

where, in General Formula (D), X represents a halogen atom.

Examples of the halogen atom represented by X in General Formula (D) include a fluorine atom, a chlorine atom, a bromine atom and an iodine atom.

Examples of the amine monomer include diethylene triamine, triethylenetetramine, tetraethylenepentamine and iminobispropylamine. Among these, an amine monomer represented by Structural Formula (E) below is particularly preferable since it is industrially manufactured and is readily available.

<Structural Formula (E)>

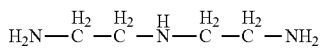

Here, a quaternary ammonium-type cationic polymer or in some cases a water-dispersible cationic polymer other than the above compounds may be used as the water-soluble cationic polymer.

A weight-average molecular weight of the water-soluble cationic polymer varies depending on the types of the copolymer. Nonetheless, it is preferably in a range of 500 to 100,000 in the case of the polyamine-epihalohydrin copolymer; it is preferably in a range of 5,000,000 or less in the case of the polyamide-epihalohydrin copolymer or the polyamide polyamine-epihalohydrin copolymer; it is preferably in a range of 700 to 50,000 in the case of the amine-epihalohydrin copolymer.

When the weight-average molecular weight exceeds the respective upper limits, there are cases where no aqueous solution is formed. When it is below the respective lower limit, there are cases where an effect of treatment with the pre-treatment liquid degrades.

A content of the water-soluble cationic polymer with respect to a total content of the pre-treatment liquid is preferably 10% by mass to 70% by mass, and more preferably 20% by mass to 60% by mass.

When the content is 10% by mass or greater, an effect of suppressing decrease in agglomeration after the drying step is fully demonstrated. Also, the content of 70% by mass or less provides the same effect of improving image quality as in the case exceeding 70% by mass while causing no difficulties in adding the ammonium salt of an organic acid or adding a material imparting functions such as penetration and wettability other than the agglomeration effect required for coating on the recording medium.

Examples of the other water-soluble cationic polymer include poly(vinylpyridine) salts, polyalkylaminoethylacrylate, polyalkylaminoethylmethacrylate, poly(vinylimidazole), polyethylenimine, polybiguanide, polyguanide, polyamine or derivatives thereof, and polyallylamine or derivatives thereof.

—Ammonium Salt of Organic Acid—

Favorable examples of the ammonium salt of an organic acid in terms of solubility to water include ammonium lactate, ammonium acetate, ammonium propionate, ammonium oxalate, ammonium tartrate, ammonium succinate (diammonium succinate), diammonium malonate, ammonium malate, ammonium citrate, diammonium hydrogen citrate, triammonium citrate and ammonium L-glutamate. Among these, ammonium lactate having weak corrosiveness is more preferable in view of corrosiveness and resistance to acids against a metal member such as aluminum and SUS.

A content of the ammonium salt of an organic acid with respect to the total amount of the pre-treatment liquid is preferably 1% by mass to 40% by mass, and more preferably 10% by mass to 30% by mass.

When the content is 1% by mass or greater, an effect of suppressing decrease in agglomeration after the drying step is fully demonstrated while maintaining the agglomeration of the pre-treatment liquid itself before the drying step. Also, when the content is 40% by mass or less, an amount of the water-soluble cationic polymer is sufficient for suppressing decrease in agglomeration after the drying step, and the effect of suppressing decrease in agglomeration is fully demonstrated.

The pre-treatment liquid must include both the water-soluble cationic polymer and the ammonium salt of an organic acid, and a total content thereof with respect to the total amount of the pre-treatment liquid is preferably 30% by mass or greater, more preferably 30% by mass to 70% by mass, and further preferably 40% by mass to 60% by mass.

When the content is 30% by mass or greater, the effect of suppressing decrease in agglomeration after the drying step is fully demonstrated. Also, when the content is 70% by mass or less, the effect of improving image quality may be fully demonstrated while causing no difficulties in adding a material imparting functions such as penetration and wettability other than the agglomeration effect required for coating on the recording medium.

<<Water>>

The water is not particularly restricted, and it may be appropriately selected according to purpose. Examples thereof include: pure water such as ion-exchanged water, ultrafiltered water, reverse osmosis water and distilled water; and ultrapure water.

A content of the water in the pre-treatment liquid is not particularly restricted, and it may be appropriately selected according to purpose.

<<Other Components>>

The other components are not particularly restricted, and they may be appropriately selected according to purpose. Examples thereof include a wetting agent, a surfactant, a penetrating agent, a foam suppressing agent, a pH adjuster, an antiseptic and fungicide and a rust inhibitor.

—Wetting Agent—

The wetting agent may be added to the pre-treatment liquid according to necessity.

The wetting agent is added for the purpose of adjusting viscosity and fluidity of the pre-treatment liquid and imparting moisture-retaining property for stability. Examples thereof include a water-soluble organic solvent and other wetting agents which impart wettability when dissolved in water such as sugars.

—Water-Soluble Organic Solvent—

The water-soluble organic solvent used as the wetting agent in the pre-treatment liquid is used for the purpose of retaining water included in the pre-treatment liquid.

Thereby, viscosity increase in the pre-treatment liquid is suppressed even when water and so on in the pre-treatment liquid have evaporated in nozzles or a coating apparatus for providing the pre-treatment liquid, which as a result maintains discharge and coating stability. In this viewpoint, as the water-soluble organic solvent, it is preferable to use a water-soluble organic solvent having a high equilibrium moisture content. However, in a viewpoint of agglomeration effect of the pre-treatment liquid, the water-soluble organic solvent preferably has an equilibrium moisture content not excessively high.

Here, regarding the equilibrium moisture content, a mixture of the water-soluble organic solvent and water is exposed in air under certain temperature and humidity conditions, and evaporation of water in the mixture and absorption of water in the air into the water-soluble organic solvent reaches equilibrium. The equilibrium moisture content is defined as a moisture content at the equilibrium.

In the present invention, 1 g of the water-soluble organic solvent weighed on a petri dish was stored in a desiccator having a temperature and a humidity maintained at 23° C. ±1° C. and 80% ±3% RH, respectively, by means of an aqueous solution saturated with potassium chloride until there is no mass change thereof, and the equilibrium moisture content may be obtained by the following formula.

$$\text{Equilibrium moisture content (wt. \%)} = \frac{M_{moisture}}{M_{solvent} + M_{moisture}} \times 100$$

where Mmoisture is an amount of moisture absorbed by the water-soluble organic solvent; $M_{solvent}$ is the amount of the water-soluble organic solvent.

Examples of the water-soluble organic solvent used in the pre-treatment liquid include polyhydric alcohols, polyhydric alcohol alkyl ethers, polyhydric alcohol aryl ethers, nitrogen-containing heterocyclic compounds, amides, amines, sulfur-containing compounds, propylene carbonate and ethylene carbonate.

Examples of the water-soluble organic solvent favorably used in terms of maintaining discharge and coating stability include water-soluble organic solvents having an equilibrium moisture content in an environment with a temperature of 23° C. and a humidity of 80% RH of 30% by mass or greater, and preferably 40% by mass or greater.

Polyhydric alcohols are favorably used as the water-soluble organic solvents, and specific examples thereof include: 1,2,3-butanetriol (bp (boiling point): 175° C./pressure in measuring the by (noted only when it is not 1 atmosphere): 33 hPa; equilibrium moisture content: 38% by mass), 1,2,4-butanetriol (bp: 190° C. to 191° C./24 hPa; equilibrium moisture content: 41% by mass), glycerin (bp: 290° C.; equilibrium moisture content: 49% by mass), diglycerin (bp: 270° C./20 hPa;

equilibrium moisture content: 38% by mass), triethylene glycol (bp: 285° C., 39% by mass), tetraethylene glycol (bp: 324° C. to 330° C.; equilibrium moisture content: 37% by mass), diethylene glycol (bp: 245° C.; equilibrium moisture content: 43% by mass) and 1,3-butanediol (bp: 203° C. to 204° C.; equilibrium moisture content: 35% by mass).

Also, examples of the water-soluble organic solvents having an equilibrium moisture content not excessively high, favorably used in view of agglomeration effect of the pre-treatment liquid include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate and other water-soluble organic solvents having an equilibrium moisture content at a temperature of 23° C. and a humidity of 80% RH of less than 30% by mass.

Examples of the polyhydric alcohols as the water-soluble organic solvent include dipropylene glycol (bp: 232° C.), 1,5-pentanediol (bp: 242° C.), 3-methyl-1,3-butanediol (bp: 203° C.), propylene glycol (bp: 187° C.), 2-methyl-2,4-pentanediol (bp: 197° C.), ethylene glycol (bp: 196° C. to 198° C.), tripropylene glycol (bp: 267° C.), hexylene glycol (bp: 197° C.), polyethylene glycol (viscous liquid to solid), polypropylene glycol (bp: 187° C.), 1,6-hexanediol (bp: 253° C. to 260° C.), 1,2,6-hexanetriol (bp: 178° C.), trimethylolethane (solid; mp (melting point): 199° C. to 201° C.) and trimethylolpropane (solid; mp: 61° C.).

Examples of the polyhydric alcohol alkyl ethers include ethylene glycol monoethyl ether (bp: 135° C.), ethylene glycol monobutyl ether (bp: 171° C.), diethylene glycol monomethyl ether (bp: 194° C.), diethylene glycol monoethyl ether (bp: 197° C.), diethylene glycol monobutyl ether (bp: 231° C.), ethylene glycol mono-2-ethylhexyl ether (bp: 229° C.) and propylene glycol monoethyl ether (bp: 132° C.).

Examples of the polyhydric alcohol aryl ethers include ethylene glycol monophenyl ether (bp: 237° C.) and ethylene glycol monobenzyl ether.

Examples of the nitrogen-containing heterocyclic compounds include 2-pyrrolidone (bp: 250° C., mp: 25.5° C.; equilibrium moisture content: 47% by mass to 48% by mass), N-methyl-2-pyrrolidone (bp: 202° C.), 1,3-dimethyl-2-imidazolidinone (bp: 226° C.), e-caprolactam (bp: 270° C.) and y-butyrolactone (bp: 204° C. to 205° C.).

Examples of the amides include formamide (bp: 210° C.), N-methylformamide (bp: 199° C. to 201° C.), N,N-dimethylformamide (bp: 153° C.) and N,N-diethylformamide (bp: 176° C. to 177° C.).

Examples of the amines include monoethanolamine (bp: 170° C.), diethanolamine (bp: 268° C.), triethanolamine (bp: 360° C.), N,N-dimethylmonoethanolamine (bp: 139° C.), N-methyldiethanolamine (bp: 243° C.), N-methylethanolamine (bp: 159° C.), N-phenylethanolamine (bp: 282° C. to 287° C.) and 3-aminopropyldiethylamine (bp: 169° C.).

Examples of the sulfur-containing compounds include dimethyl sulfoxide (bp: 139° C.), sulfolane (bp: 285° C.) and thiodiglycol (bp: 282° C.).

Among the water-soluble organic solvents, polyhydric alcohols are preferably used in view of discharge and coating stability and agglomeration effect of the pre-treatment liquid, and glycerin, 1,3-butanediol and 3-methyl-1,3-butanediol are more preferable.

A content of the water-soluble organic solvent in the pre-treatment liquid is not particularly restricted, and it may be appropriately selected according to purpose. Nonetheless, it is preferably 5% by mass to 80% by mass, and more preferably 10% by mass to 20% by mass.

When the content of the water-soluble organic solvent is 80% by mass or less, drying properties of the recording medium with the pre-treatment liquid applied thereon do not degrade regardless of the types of the water-soluble organic solvent. Also, since an amount of the agglomerating agent added in the pre-treatment liquid is sufficient, agglomeration of the pre-treatment liquid does not significantly degrade. On the other hand, when the content of the water-soluble organic solvent is 5% by mass or greater, water included in the pre-treatment liquid does not easily vaporize. Thus, there is no risk of water vaporization, which raises the viscosity of the pre-treatment liquid and causes defects in the coating step.

As the other wetting agents, materials which dissolve in an aqueous solution and exhibit a function as a wetting agent may be used. Preferable examples thereof include sugars.

Examples of the sugars include monosaccharides, disaccharides, oligosaccharides (including trisaccharide and tetrasaccharides) and polysaccharides.

Specific examples thereof include glucose, mannose, fructose, ribose, xylose, arabinose, galactose, maltose, cellobiose, lactose, sucrose, trehalose and maltotriose.

Here, polysaccharides refer to sugars in a broad sense, and it is used to mean substances existing widely in nature such as α-cyclodextrin and cellulose.

Also, examples of derivatives of these sugars include reducing sugars of the sugars (e.g. sugar alcohols (represented by general formula: $HOCH_2(CHOH)nCH_2OH$, where n represents an integer of 1 to 6)), oxidized sugars (e.g. aldonic acids, uronic acids and so on), amino acids and thioacids.

Among these, the sugar alcohols are preferable, and specific examples thereof include maltitol and sorbit.

—Surfactant—

The pre-treatment liquid used in the present invention may include a surfactant in order to reform wettability of the recording medium and to improve an image of the recorded matter in terms of concentration, color saturation and white spots (meaning white space remaining in an image of the recorded matter).

A content of the surfactant with respect to the total amount of the pre-treatment liquid is preferably 0.001% by mass to 5% by mass, and more preferably 0.05% by mass to 2% by mass.

Addition of the surfactant is effective when the content is 0.001% by mass or greater. When the content is 5% by mass or less, the same effect as in the case exceeding 5% by mass may be achieved.

Examples of the surfactant include a fluorosurfactant, a silicone surfactant, a nonionic surfactant, an anionic surfactant and a betaine surfactant. Among these, the nonionic surfactant is favorably used in view of improved granularity.

Examples of the nonionic surfactant include polyoxyethylene alkyl ether, polyoxyethylene alkyl allyl ether, polyoxyethylene alkylphenyl ether, polyoxyethylene glycol ester, polyoxyethylene fatty acid amide, polyoxyethylene fatty acid ester, polyoxyethylene polyoxypropylene glycol, glycerin ester, sorbitan ester, sucrose ester, polyoxyethylene ethers of glycerin ester, polyoxyethylene ethers of sorbitan ester, polyoxyethylene ethers of sorbitol ester, fatty acid alkanolamide, amine oxide, polyoxyethylene alkyl amine, glycerin fatty acid ester, sorbitan fatty acid ester, polyoxyethylene sorbitan fatty acid ester, polyoxyethylene sorbitol fatty acid ester and alkyl(poly)glycoxide.

—Penetrating Agent—

The pre-treatment liquid used in the present invention preferably includes, as a penetrating agent, a non-wetting polyol compound or a glycol ether compound, respectively having 8 to 11 carbon atoms, or both thereof. Also, these preferably have a solubility of 0.2% by mass to 5% by mass in water at 25° C.

Among these, 2-ethyl-1,3-hexanediol [solubility: 4.2% by mass (25° C.)] and 2,2,4-trimethyl-1,3-pentanediol [solubility: 2.0% by mass (25° C.)] are particularly preferable.

Examples of the other non-wetting polyol compound include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol and 5-hexene-1,2-diol.

Other penetrating agents that may be used in combination are not particularly restricted as long as they are dissolved in the pre-treatment liquid for adjustment to desired properties, and they may be appropriately selected according to purpose. Examples thereof include: alkyl and allyl ethers of a polyhydric alcohol such as diethylene glycol monophenyl ether, ethylene glycol monophenyl ether, ethylene glycol monoallyl ether, diethylene glycol monophenyl ether, diethylene glycol monobutyl ether, propylene glycol monobutyl ether and tetraethylene glycol chlorophenyl ether; and lower alcohols such as ethanol.

A content of the penetrating agent in the pre-treatment liquid is preferably 0.1% by mass to 5.0% by mass. When the content is 0.1% by mass or greater, an effect of penetrating the pre-treatment liquid may be achieved. When the content is 5.0% by mass or less, a solubility of the penetrating agent in a solvent is low. Thus, there is no risk of saturating effect of improving the permeability by separating from the solvent.

—Foam Suppressing Agent—

The pre-treatment liquid used in the present invention may include a foam suppressing agent in order to suppress foaming (meaning a liquid forming a thin film wraps air). In general, foaming hardly occurs in a liquid having a high surface tension such as water since a force acts to reduce a surface area of the liquid as much as possible. To the contrary, foaming easily occurs in a liquid having a low surface tension and a high viscosity. Bubbles formed are maintained, and it is difficult to defoam them.

The pretreatment liquid used in the present invention has a decreased surface tension and an increased viscosity when it includes the water-soluble cationic polymer, the water-soluble organic solvent or the surfactant. The pre-treatment liquid is easily foamed thereby. Thus, the foam suppressing agent is favorably used.

In the present invention, the surface tension significantly decreases when the pre-treatment liquid includes the nonionic surfactant. In this case, foaming may be suppressed by using a component usually insoluble in a liquid as the foam suppressing agent and sprinkling this component on a surface of the bubbles.

However, the component insoluble in a liquid reduces discharge stability and storage stability. Thus, in the present embodiment, the foam suppressing agent represented by Formula (6) below is favorably used when the pre-treatment liquid includes the nonionic surfactant.

$$HOR_1R_3C-[CH_2]_n-CR_2R_4OH \qquad (6)$$

where, in Formula (6), $R_1$ and $R_2$ respectively represent an alkyl group having 3 to 6 carbon atoms; $R_3$ and $R_4$ respectively represents an alkyl group having 1 to 2 carbon atoms; n represents an integer of 1 to 6.

The foam suppressing agent represented by Formula (6) is highly compatible with the nonionic surfactant, and the foam suppressing agent is efficiently incorporated in foam films. It is considered that a difference in surface tension between the nonionic surfactant and the foam suppressing agent makes a surface of the foam films locally imbalanced, destroying the bubbles.

Examples of the foam suppressing agent represented by Formula (6) include 2,4,7,9-tetramethyl decane-4,7-diol and 2,5,8,11-tetramethyldodecane-5,8-diol. Among these, 2,5,8,11-tetramethyldodecane-5,8-diol is particularly preferable in view of effect of foaming suppression and high compatibility with the pre-treatment liquid.

A content of the foam suppressing agent in the pre-treatment liquid is preferably 0.01% by mass to 10% by mass, and more preferably 0.02% by mass to 5% by mass.

When the content of the foam suppressing agent is 0.01% by mass or greater, sufficient foam suppression effect can be achieved. When the content is 10% by mass or less, sufficient foam suppression effect can be achieved, and there is no risk of the foam suppressing agent becoming insoluble in the pre-treatment liquid.

—pH Adjuster—

The pH adjuster is not particularly restricted as long as it can adjust a pH in a range of 4 to 8 without adversely affecting the ink to be formulated, and it may be appropriately selected according to purpose. When the pH of the pre-treatment liquid exceeds 8, there is a possibility that the agglomeration effect significantly degrades. Also, when the pH is less than 4, there is a possibility that rollers and so on of a conveying member in contact with the pre-treatment liquid corrode, causing failure in a conveying function.

Examples of the pH adjuster include alcohol amines, hydroxides of alkali metal elements, ammonium hydroxides, phosphonium hydroxides and carbonates of alkali metals.

Examples of the alcohol amines include diethanolamine, triethanolamine and 2-amino-2-ethyl-1,3-propanediol.

Examples of the hydroxides of the alkali metal elements include lithium hydroxide, sodium hydroxide and potassium hydroxide.

Examples of the ammonium hydroxides include ammonium hydroxide and quaternary ammonium hydroxide.

Examples of the phosphonium hydroxides include quaternary phosphonium hydroxide.

Examples of the carbonates of alkali metals include lithium carbonate, sodium carbonate and potassium carbonate.

—Antiseptic and Fungicide—

Examples of the antiseptic and fungicide include sodium dehydroacetate, sodium sorbate, sodium 2-pyridinethiol-1-oxide, sodium benzoate, sodium pentachlorophenol and a sodium compound of 1,2-benzisothiazolin-3-one.

—Rust Inhibitor—

Examples of the rust inhibitor include acid sulfites, sodium thiosulfate, ammonium thiodiglycolate, diisopropylammonium nitrite, pentaerythritol tetranitrate, dicyclohexylammonium nitrite and 1,2,3-benzotriazole.

<Drying Step>

The drying step is a step for drying the recording medium on which the pre-treatment liquid has been applied.

As the step for drying the pre-treatment liquid deposited on the recording medium, a possible method is drying artificially to an extent that a failure of the conveying member or degradation of image quality due to accumulation of contamination does not occur because of transfer of the pre-treatment liquid deposited on the recording medium to the conveying member in contact therewith between the pre-treatment liquid application step and image formation by a discharged ink. A drying temperature is preferably 40° C. to 130° C., and more preferably 80° C. to 100° C. When the drying temperature is less than 40° C., there are cases that a drying time is excessively long. There is a possibility that the drying temperature exceeding 130° C. harms the recording medium.

Examples of the drying method include a heat-drum method, an oven method, a method of blowing warm air, a preheater method and a heat roller method. A combination thereof may also be used.

Also, "drying" after application of the pre-treatment liquid does not mean that the recording medium looks apparently dry due to the pre-treatment liquid absorbed by the recording medium, but it means that the pre-treatment liquid cannot maintain a liquid state due to evaporation of liquids such as moisture in the pre-treatment liquid and solidifies.

<Image Forming Step>

The image forming step is a step for forming an image by discharging a water-based ink on the recording medium after drying by inkjet method.

A step for depositing an ink in a recording method of the present embodiment is to apply and deposit an ink on a recording medium which has the pre-treatment liquid of the present embodiment deposited thereon and has been through the pre-treatment liquid drying step to thereby form an image on this recording medium. As a method for depositing the ink, a method of discharging the ink by applying a stimulus (energy) using a predetermined device to thereby deposit the ink on the recording medium is favorably used. Specifically, heretofore known inkjet recording methods may be used. Examples of such inkjet recording methods include an inkjet recording method for recording an image on a recording medium as continuous paper using heads in line and an inkjet recording method of scanning heads.

In the step for depositing an ink, a drive method of a recording head as a means for discharging the ink is not particularly restricted, and it may be appropriately selected according to purpose. Examples thereof include: an actuator of a piezoelectric element using PZT (lead zirconate titanate); a method of applying thermal energy; a method using a head of an on-demand type with an actuator using an electrostatic force; and a method of recording with a continuous-injection head of a charge control type.

A flexible control of discharging liquid droplet is considered difficult in the method of applying thermal energy, and there tend to be large variations in the quality of a recorded image depending on types of the recording medium. However, this problem may be solved by applying the pre-treatment liquid on the recording medium, and a recorded matter with stable and high quality may be obtained regardless of the types of the recording medium.

<<Water-Based Ink>>

The water-based ink includes water and negatively charged colored particles including a colorant, and it further includes other components according to necessity.

In the water-based ink, the negatively charged colored particles including a colorant are dispersed in water and so on by electrostatic repulsion.

Colors of the ink are not particularly restricted, and they may be appropriately selected according to purpose. Examples thereof include yellow, magenta, cyan and black. A color image may be recorded when an ink set including two or more types of inks of these colors is used, and a full-color image may be recorded when an ink set including inks of at least three colors is used.

This ink is favorably used in an inkjet recording method with a recording apparatus such as so-called piezo recording apparatus (see JP-A No. 02-51734), so-called thermal recording apparatus (see JP-A No. 61-59911) and so-called electrostatic recording apparatus (see JP-A No. 06-71882). Also, this ink is favorably used, for example, in a recording apparatus which heats a recording medium and the ink to a predetermined temperature during recording or before and after recording for promoting fixing of a recorded matter. Also, this ink is used in a recording apparatus which heats a recording medium and the ink to 50° C. to 200° C., for example, during recording or before and after recording for promoting fixing of a recorded matter.

Physical properties of the water-based ink are not particularly restricted, and they are appropriately selected according to purpose. For example, it preferably has a viscosity and a surface tension in the following ranges. The viscosity of the ink at 25° C. is preferably 5 mPa·s to 20 mPa·s. The viscosity of the ink of 5 mPa·s or greater provides an effect of improving density and quality of a recorded image. Meanwhile, the viscosity of the ink of 20 mPa·s or less provides favorable discharge stability.

Here, the viscosity may be measured at 25° C. using a viscometer RE-550L, manufactured by Toki Sangyo Co., Ltd.

The surface tension of the ink at 25° C. is preferably 20 mN/m to 35 mN/m, and more preferably 20 mN/m to 30 mN/m. The surface tension of the ink of 20 mN/m to 35 mN/m increases penetration of the ink and provides favorable drying properties, resulting in decreased color bleeding even in recording on plain paper. Also, an area of the recording medium with the liquid composition deposited thereon is easily wetted, which increases color saturation of the recorded matter and improves white spots. When the surface tension exceeds 35 mN/m, the ink does not easily level on the recording medium (leveling means that the ink uniformly wets and spreads on the surface of the recording medium), which may lead to a prolonged drying time.

—Colorant—

As the colorant, a pigment is mainly used in view of weather resistance, but a dye may be used in combination within a range not to degrade weather resistance for adjustment of color tone. This pigment is not particularly restricted, and it may be appropriately selected according to purpose. For example, black or color inorganic pigments and organic pigments are used. These pigments may be used alone or in combination of two or more.

Examples of the inorganic pigment include: titanium oxide, iron oxide, calcium carbonate, barium sulfate, aluminum hydroxide, barium yellow, cadmium red and chrome yellow; and carbon black prepared by a heretofore known method such as contact method, furnace method and thermal method.

Examples of the organic pigment include azo pigments (including azo lake, insoluble azo pigments, condensed azo pigments, chelate azo pigments and so on), polycyclic pigments (e.g. phthalocyanine pigments, perylene pigments, perinone pigments, anthraquinone pigments, quinacridone pigments, dioxazine pigments, indigo pigments, thioindigo pigments, isoindolinone pigments, quinophthalone pigments and so on), dye-type chelates (e.g. basic dye-type chelate, acid dye-type chelate and so on), nitro pigments, nitroso pigments and aniline black. Among these pigments in particular, those highly compatible with water are favorably used.

Specific examples of the more favorably used pigments for black include: carbon black such as furnace black, lampblack, acetylene black and channel black (C. I. Pigment Black 7); metals such as copper, iron (C. I. Pigment Black 11) and titanium oxide; and organic pigments such as aniline black (C. I. Pigment Black 1).

Specific examples thereof for color include C. I. Pigment Yellow 1, 3, 12, 13, 14, 17, 24, 34, 35, 37, 42 (yellow iron oxide), 53, 55, 74, 81, 83, 95, 97, 98, 100, 101, 104, 108, 109, 110, 117, 120, 128, 138, 150, 151, 153, 183, C. I. Pigment Orange 5, 13, 16, 17, 36, 43, 51, C. I. Pigment Red 1, 2, 3, 5, 17, 22, 23, 31, 38, 48:2 (Permanent Red 2B(Ca)), 48: 3, 48: 4, 49: 1, 52: 2, 53: 1, 57: 1 (Brilliant Carmine 6B), 60: 1, 63: 1, 63: 2, 64: 1, 81, 83, 88, 101 (colcothar), 104, 105, 106, 108 (cadmium red), 112, 114, 122 (quinacridone magenta), 123, 146, 149, 166, 168, 170, 172, 177, 178, 179, 185, 190, 193, 209, C. I. Pigment Violet 1 (Rhodamine Lake), 3, 5: 1, 16, 19, 23, 38, C. I. Pigment Blue 1, 2, 15, 15: 1, 15: 2, 15: 3 (Phthalocyanine Blue), 16, 17: 1, 56, 60, 63, and C.I. Pigment Green 1, 4, 7, 8, 10, 17, 18, 36.

In the present invention, the colorant is dispersed in water as negatively charged particles. In this case, favorable embodiments of dispersing the pigment in water include the following first to third embodiments.

In the first embodiment, a dispersoid in which a water-insoluble or poorly water-soluble colorant included in polymer fine particles (which may also be referred to as "resin-coated pigment") is dispersed in water as a dispersion medium to obtain a polymer emulsion (water dispersion of the polymer fine particles including a colorant). Here, in this case, it is referred to as "emulsion" in the present invention although the dispersoid includes a solid.

In the second embodiment, a pigment having at least one type of a hydrophilic group on a surface thereof and having water dispersibility in the absence of a dispersant (which may also be referred to as "self-dispersible pigment") is dispersed in water.

In the third embodiment, a pigment is dispersed in water with an anionic dispersant or a nonionic dispersant.

Examples of the polymer emulsion used in the first embodiment include: a dispersoid in which the pigment is encapsulated in the polymer fine particles; and a dispersion of a dispersoid with the pigment adsorbed on a surface of the polymer fine particles dispersed in a dispersion medium. In this case, it is not necessary that the pigment is completely encapsulated or adsorbed; rather, the pigment may be dispersed in the emulsion to an extent that the effect of the present invention is not impaired. Examples of polymers forming the polymer emulsion (polymers in the polymer fine particles) include an anionic vinyl polymer, a polyester polymer and a polyurethane polymer. Among these, the anionic vinyl polymer and the polyester polymer are preferable.

As the anionic vinyl polymer and the polyester polymer, polymers disclosed in JP-A No. 2000-53897, JP-A No. 2001-139849 and so on may be used.

The self-dispersible pigment of the second embodiment is a pigment with surface modification by bonding at least one type of a hydrophilic group on a surface of the pigment directly or via another atomic group. Examples of a method used for this surface modification include: a method of chemically bonding a predetermined anionic functional group (functional group such as sulfonic group and carboxyl group) on the surface of the pigment; and a method of wet-oxidation treatment using at least any one of a hypohalous acid such as hypochlorous acid and salts thereof. Among these, an embodiment that the pigment having a carboxyl group bonded on the surface thereof is dispersed in water is particularly preferable. The carboxyl group bonded on the surface of the pigment improves dispersion stability of the pigment, provides a high-quality image and improves water resistance of the recording medium after recording. Also, an ink including the self-dispersible pigment of the second embodiment has superior re-dispersibility after drying. Thus, the ink does not cause clogging even when recording is suspended over a period of time and moisture in the ink filled in nozzles of a recording apparatus has evaporated. Therefore, favorable recording is possible easily with only a simple cleaning operation.

In order to obtain such features, the self-dispersible pigment has a volume-average particle diameter ($D_{50}$) in the ink of preferably 0.01 to 0.16 μm. Here, $D_5O$ is also referred to as a median diameter, meaning a certain particle diameter at which a group of particles with a larger diameter and a group of particles with a smaller diameter have equal amounts when the particles are divided into two groups at the particle diameter (e.g. volume-average particle diameter). Here, in the present invention, when the self-dispersible pigment of the second embodiment is used, the ink preferably includes a water-dispersible resin explained later for improved fixability (scratch resistance) and improved coloring property of the colorant on the recording medium.

When the self-dispersible pigment is self-dispersible carbon black, examples of the anionic functional group bonded to the carbon black include —COOM, —SO$_3$M, —PO$_3$HM, —PO$_3$M$_2$, —SO$_2$NH$_2$ and —SO$_2$NHCOR (where M represents an alkali metal, an ammonium or an organic ammonium; R represents an alkyl group having 1 to 12 carbon atoms, a phenyl group which may have one or more substituents or a naphthyl group which may have one or more substituents). Among these, —COOM and —SO$_3$M are preferable.

Also, when "M" in the functional group is the alkali metal, lithium, sodium, potassium and so on are used, for example. When "M" is the organic ammonium, mono-to tri-(mono-, di- or tri-)methyl ammonium, mono- to triethyl ammonium and mono- to trimethanol ammonium are used, for example. The functional group may be bonded to the surface of the carbon black via another atomic group. Examples of the another atomic group include an alkyl group having 1 to 12 carbon atoms, a phenyl group which may have one or more substituents and a naphthyl group which may have one or more substituents. Specific examples of the functional group bonded to the surface of the carbon black via the atomic group include —C$_2$H$_4$COOM (where M represents an alkali metal or a quaternary ammonium) and —PhSO$_3$M (where Ph represents a phenyl group; M represents an alkali metal or a quaternary ammonium).

When the self-dispersible pigment is a color pigment, in order to obtain a color pigment including an anionic functional group, it is possible to introduce the anionic functional group (e.g. —COONa) by a method such as oxidation treatment of the color pigment with sodium hypochlorite, sulfonation, and reaction with a diazonium salt.

In the third embodiment, the pigment is dispersed by the anionic dispersant or the nonionic dispersant. Examples of this anionic dispersant include: polyoxyethylene alkyl ether acetates, alkylbenzene sulfonates (NH$_4$, Na, Ca); alkyl diphenyl ether disulfonates (NH$_4$, Na, Ca); sodium dialkylsuccinate sulfonates; sodium naphthalene sulfonate formaldehyde condensates; polyoxyethylene polycyclicphenyl ether sulfates (NH$_4$, Na) and laurates; and polyoxyethylene alkyl ether sulfates and oleates. Among these, as specific examples of the anionic dispersant, sodium dioctylsulfosuccinate and ammonium polyoxyethylene styrenephenyl ether sulfonate are preferable.

The nonionic dispersant having an HLB value of 10 to 20, and examples thereof include polyoxyethylene alkyl ether, polyoxyalkylene alkyl ether, polyoxyethylene polycyclicphenyl ether, sorbitan fatty acid esters, polyoxyethylene sorbitan fatty acid esters, polyoxyethylene alkylphenyl ethers, polyoxyethylene alkyl amines, polyoxyethylene alkylamides and acetylene glycol. Among these, as specific examples of the nonionic dispersant, polyoxyethylene lauryl ether, polyoxyethylene-β-naphthyl ether, polyoxyethylene sorbitan monooleate and polyoxyethylene styrenephenyl ether are more preferable. Here, even when the nonionic dispersant is used, the water-based ink may be negatively charged as a whole system by using a negatively charged resin emulsion in combination.

In the third embodiment, the pigment dispersion is dissolved in an aqueous medium. Then, the organic pigment or the inorganic pigment is added, and it is sufficiently wetted. Then, it is subjected to high-speed stirring, dispersion in a disperser using balls such as bead mill and ball mill, kneading and dispersion in a kneader-disperser using a shearing force such as roll mill, or dispersion using an ultrasonic disperser, and thereby, the pigment dispersant is prepared. Here, a product of such a kneading and dispersing step often includes coarse particles, which cause clogging in nozzles and supplying paths in the recording apparatus. Thus, it is necessary to remove particles having a particle diameter of 1 μm or greater using a filter or a centrifuge.

In the present invention, the dispersant is used preferably in a range of 1 part by mass to 100 parts by mass with respect to 100 parts by mass of the pigment, and more preferably 10 parts by mass to 50 parts by mass. When the amount of the dispersant is small, the pigment cannot be sufficiently refined. When the amount of the dispersant is in excess, an excess component of the dispersant which is not adsorbed to the pigment affect physical properties of the ink. This may cause bleeding of a recorded image or degradation of water resistance and scratch resistance. Here, in the present invention, when the pigment of the third embodiment is used, the ink preferably includes a water-dispersible resin explained later for improved fixability (scratch resistance) and improved coloring property of the colorant on the recording medium.

Further, to stabilize the pigment dispersion, a water-soluble polymer compound having a weight-average molecular weight of 30,000 or less may be used in combination. As the water-soluble polymer compound, a water-soluble styrene-acrylic resin, a water-soluble acrylic resin, water-soluble polyurethane, water-soluble polyester, a water-soluble styrene-maleic acid copolymer and a water-soluble a-olefin-maleic acid copolymer having a weight-average molecular weight of 30,000 or less are generally preferable. Among these, the water-soluble polyurethane, the water-soluble polyester and the water-soluble α-olefin-maleic acid copolymer represented by Formula (7) below are particularly preferable.

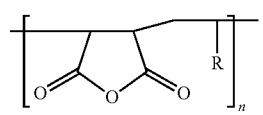

(7)

where, in Formula (7), R represents an alkyl group having 6 to 22 carbon atoms; n represents 30 to 100.

The water-soluble α-olefin-maleic acid copolymer represented by Formula (7) has an acid value of preferably 100 mgKOH/g to 400 mgKOH/g. When the acid value is less than 100 mgKOH/g, solubility may degrade. On the other hand, when the acid value exceeds 400 mgKOH/g, viscosity of the pigment dispersion increases, and there are risks of easily degrading discharge and easily degrading dispersion stability of the pigment dispersion.

The water-soluble α-olefin-maleic acid copolymer of Formula (7) has a weight-average molecular weight of preferably 5,000 to 20,000. When the weight-average molecular weight is less than 5,000, dispersion stability of the pigment dispersion may degrade. On the other hand, when the weight-average molecular weight exceeds 20,000, viscosity of the pigment dispersion may increase due to poor solubility.

A content of the water-soluble polymer compound in terms of solid content is preferably 1 part by mass to 100 parts by mass, and more preferably 5 parts by mass to 50 parts by mass with respect to 100 parts by mass of the pigment. When the content of the water-soluble polymer compound is less than 1 part by mass, there are cases of insufficient effect of improving dispersion stability. On the other hand, ink viscosity increases when the content exceeds 100 parts by mass. As a result, there are possibilities that discharge stability degrades and that increasing the amount no longer changes the effect of improving dispersion stability.

The pigment as a colorant has a volume-average particle diameter in the water-based ink of preferably 150 nm or less, and more preferably 100 nm or less. When the volume-average particle diameter exceeds 150 nm, discharge stability degrades rapidly, which may easily cause nozzle clogging or ink deflection. When the volume-average particle diameter is 100 nm or less, discharge stability improves, and further color saturation of an image also improves.

A content of the pigment as a colorant in the water-based ink is not particularly restricted, and it may be appropriately selected according to purpose. Nonetheless, it is preferably 1% by mass to 15% by mass, and more preferably 2% by mass to 12% by mass. Also, the polymer emulsion of the first embodiment that the pigment is coated with the anionic polymer fine particles, the self-dispersible pigment of the second embodiment and the water-dispersible colorant of the third embodiment may be mixed and used in combination.

<<Water>>

The water is not particularly restricted, and it may be appropriately selected according to purpose. Examples thereof include: pure water such as ion-exchanged water, ultrafiltered water, reverse osmosis water and distilled water; and ultrapure water.

A content of the water in the water-based ink is not particularly restricted, and it may be appropriately selected according to purpose.

<<Other Components>>

Examples of the other components include a wetting agent, a surfactant, a penetrating agent, a foam suppressing agent, a pH adjuster, an antiseptic and fungicide and a rust inhibitor.

As the other components, those exemplified as the other components in the pre-treatment liquid may be used.

(Image Forming Apparatus)

An image forming apparatus of the present invention includes:

a pre-treatment liquid applying unit configured to apply a pre-treatment liquid on a recording medium including a substrate and a coating layer at least on one surface of the substrate, wherein the pre-treatment liquid is applied on a surface of the recording medium with the coating layer, a drying unit configured to dry the recording medium on which the pre-treatment liquid has been applied, and an image forming unit configured to form an image on the recording medium after drying by discharging a water-based ink by inkjet method.

It further includes other units according to necessity.

The image forming apparatus may be particularly favorably applied to a image forming apparatus which carries out inkjet recording on a recording medium conveyed at high speed.

That is, when the recording medium is conveyed by a conveying member at high speed of 10 m/min to 200 m/min, for example, a series of steps, namely application of a specific pre-treatment liquid, drying and application of an ink as in the present invention can suppress occurrence of a failure of the conveying member ore degradation of image quality due to accumulation of contamination, and it also provides an effect that image quality does not degrade even in case of artificial drying.

Here, an image forming apparatus for forming an image by applying the pre-treatment liquid used in the present invention on the recording medium, drying the coated pre-treatment liquid and then applying the ink on the recording medium is explained using a specific example of FIG. 1.

FIG. 1 illustrates an image forming apparatus used for an inkjet recording method which records an image on a recording medium as continuous paper using heads in line.

In FIG. 1, a recording medium 101 includes a coating layer at least on one surface thereof. A pre-treatment liquid applying unit 102 applies a pre-treatment liquid on a surface of the recording medium with the coating layer (pre-treatment liquid application step), and then a drying unit 103 dries the pre-treatment liquid (drying step). Thereafter, a printing unit 104 discharges a water-based inkjet on the surface of the recording medium with the pre-treatment liquid applied and dried by inkjet method to thereby form an image (image forming step), and a recording medium 105 including the image formed thereon is obtained.

(Recorded Matter)

A recorded matter of the present invention includes an image recorded by the image forming method of the present invention.

The recorded matter provides high image quality without bleeding and superior stability over time, and it may be favorably used for various applications such as documents with various characters or images recorded thereon.

EXAMPLES

Hereinafter, the present invention is further described in detail with reference to Examples, which however shall not be construed as limiting the scope of the present invention.

<Preparation of Ink>

Water-based inks used in the examples and comparative examples are prepared by a conventional method as follows.

Here, product names and manufacturers of pigment dispersions used in the following ink preparation examples are as follows.

Black dispersion: PABK49M, manufactured by Kao Corporation

Cyan dispersion: PAC205, manufactured by Kao Corporation

Magenta dispersion: PAM206, manufactured by Kao Corporation

Yellow dispersion: PAY204, manufactured by Kao Corporation

Here, each of the above dispersions disperses in a water-based ink as negatively charged colored particles including a colorant.

Ink Preparation Example 1

Cyan dispersion . . . 20.0% by mass
1,3-Butanediol . . . 23.0% by mass
Glycerin . . . 8.0% by mass
2-Ethyl-1,3-hexanediol . . . 2.0% by mass
ZONYL FS-300 (fluorosurfactant manufactured by DuPont Co.) . . . 1.0% by mass
PROXEL LV (manufactured by Avecia) . . . 0.2% by mass
2-Amino-2-ethyl-1,3-propanediol . . . 0.3% by mass
The composition was adjusted to 100% by mass by adding ion-exchanged water.

Ink Preparation Example 2

Cyan dispersion . . . 20.0% by mass
3-Methyl-1,5-pentanediol . . . 10.5% by mass 3-Methyl-1,3-butanediol . . . 13.0% by mass
Glycerin . . . 8.0% by mass
2,2,4-Trimethyl-1,3-pentanediol . . . 2.0% by mass
UNISAFE A-LM (Polyether-based nonionic surfactant, manufactured by NOF Corporation) . . . 2.0% by mass
PROXEL LV (manufactured by Avecia) . . . 0.2% by mass
2-Amino-2-ethyl-1,3-propanediol . . . 0.5% by mass
The composition was adjusted to 100% by mass by adding ion-exchanged water.

Ink Preparation Example 3

Magenta dispersion . . . 20.0% by mass
1,3-Butanediol . . . 22.5% by mass
Glycerin . . . 9.0% by mass
2-Ethyl-1,3-hexanediol . . . 2.0% by mass
ZONYL FS-300 (fluorosurfactant manufactured by DuPont Co.) . . . 1.0% by mass
PROXEL LV (manufactured by Avecia) . . . 0.2% by mass
2-Amino-2-ethyl-1,3-propanediol . . . 0.3% by mass
The composition was adjusted to 100% by mass by adding ion-exchanged water.

Ink Preparation Example 4

Magenta dispersion . . . 20.0% by mass
3-Methyl-1,3-butanediol . . . 11.5% by mass
Ethylene glycol . . . 5.0% by mass
Glycerin . . . 7.0% by mass
2-Ethyl-1,3-hexanediol . . . 2.0% by mass
KF-640 (polyether-modified silicon oil, manufactured by Shin-Etsu Chemical Co., Ltd.) . . . 0.5% by mass
PROXEL LV (manufactured by Avecia) . . . 0.2% by mass
2-Amino-2-ethyl-1,3-propanediol . . . 0.3% by mass
The composition was adjusted to 100% by mass by adding ion-exchanged water.

Ink Preparation Example 5

Yellow dispersion . . . 20.0% by mass
1,6-Hexanediol . . . 24.5% by mass
Glycerin . . . 8.0% by mass
2-Ethyl-1,3-hexanediol . . . 2.0% by mass
ZONYL FS-300 (fluorosurfactant manufactured by DuPont Co.) . . . 0.2% by mass
2-Amino-2-ethyl-1,3-propanediol . . . 0.3% by mass
The composition was adjusted to 100% by mass by adding ion-exchanged water.

Ink Preparation Example 6

Yellow dispersion . . . 20.0% by mass
3-Methyl-1,3-butanediol . . . 20.0% by mass
1,3-Butanediol . . . 8.5% by mass
Glycerin . . . 7.5% by mass
2-Ethyl-1,3-hexanediol . . . 2.0% by mass
KF-640 (polyether-modified silicon oil, manufactured by Shin-Etsu Chemical Co., Ltd.) . . . 0.5% by mass
PROXEL LV (manufactured by Avecia) . . . 0.2% by mass
1-Methylamino-2,3-propanediol . . . 0.1% by mass
The composition was adjusted to 100% by mass by adding ion-exchanged water.

Ink Preparation Example 7

Black dispersion . . . 20.0% by mass
1,5-Pentanediol . . . 22.5% by mass
Glycerin . . . 7.5% by mass
2-Pyrrolidone . . . 2.0% by mass
2-Ethyl-1,3-hexanediol . . . 2.0% by mass
R—(OCH$_2$CH$_2$)nOH (in the formula, R=C12, n=9, where R may be branched) . . . 1.0% by mass
KF-640 (polyether-modified silicon oil, manufactured by Shin-Etsu Chemical Co., Ltd.) . . . 0.1% by mass
PROXEL LV (manufactured by Avecia) . . . 0.2% by mass
2-Amino-2-ethyl-1,3-propanediol . . . 0.5% by mass
The composition was adjusted to 100% by mass by adding ion-exchanged water.

Ink Preparation Example 8

Black dispersion . . . 20.0% by mass
2-Methyl-2,4-pentanediol . . . 11.5% by mass
3-Methyl-1,3-butanediol . . . 13.0% by mass
Glycerin . . . 7.5% by mass
2-Pyrrolidone . . . 2.0% by mass
UNISAFE A-LM (Polyether-based nonionic surfactant, manufactured by NOF Corporation) . . . 2.0% by mass
2,2,4-Trimethyl-1,3-pentanediol . . . 2.0% by mass
PROXEL LV (manufactured by Avecia) . . . 0.2% by mass
1-Methylamino-2,3-propanediol . . . 0.1% by mass
The composition was adjusted to 100% by mass by adding ion-exchanged water.

Examples 1 to 6 and Comparative Examples 1 to 4

Pre-treatment liquids having compositions indicated in Table 1-1 and Table 1-2 below were respectively applied on a surface of a coating layer of a recording medium (LumiArt gloss paper, manufactured by STORA ENSO; paper thickness: 170 g/m$^2$) by a roller coating method so that a wet coating amount was 1.9±0.2 g/m$^2$, and then the recording medium was dried at 90° C. for 30 seconds by an oven method. Here, the drying time of around 1 second is sufficient in practice, but the drying time longer than practice was adopted for evaluation. Similarly, the heating temperature during drying was set higher than that in actual equipment.

Next, the water-based ink including the negatively charged pigment particles dispersed therein as manufactured above was discharged by an inkjet method in a single pass at 600 dpi, and an image was formed thereby.

Note that, granularity was evaluated about green (i.e., a secondary color of cyan and yellow) in which image bleeding was observed most significantly. Here, was a green ink including the cyan ink of Ink Preparation Example 1 and the yellow ink of Ink Preparation Example 6 with a mass ratio of 1.15: 1.00, and the ink coating amount was 3.2×10$^{-8}$ g/cm$^2$.

Also, as samples for comparison, samples were prepared by forming images without carrying out the pre-treatment liquid application step and the drying step in Examples 1 to 6 and Comparative Examples 1 to 4, and image quality and granularity were evaluated. Results are shown in Table 2.

<Image Quality>

Image quality was visually observed and evaluated based on the following criteria.

[Evaluation Criteria]

A: Image quality improved significantly compared to a recorded matter on which an image was formed without applying the pre-treatment liquid.

B: Image quality improved compared to a recorded matter on which an image was formed without applying the pre-treatment liquid.

C: Image quality improved slightly compared to a recorded matter on which an image was formed without applying the pre-treatment liquid.

D: No significant change was visually observed compared to a recorded matter on which an image was formed without applying the pre-treatment liquid.

<Granularity>

The granularity is a value indicating granular random quality due to variations in image density. Using a CCD device (product of Hamamatsu Photonics K.K, ORCA-3CCD C7780-20), a density was measured at 40 locations. A root mean square was obtained as a variation from an average density of the measurements, and the value was regarded as granularity. Here, the image density was measured based on values obtained by previously reading density data with an image density measuring device X-Rite939.

TABLE 1-1

| | Pre-treatment liquid composition (%) | | | | | | | | | |
|---|---|---|---|---|---|---|---|---|---|---|
| | (A) Water-soluble cationic polymer | | (B) Ammonium salt of organic acid | | | Total | Water-soluble organic solvent | Surfactant | Penetrating agent | pH adjuster 2-Amino-2- |
| | DK6810 | SC-506 | Ammonium lactate | Ammonium malate | Ammonium citrate | amount of (A) and (B) | 3-Methyl-1,3-butanediol | EMULGEN LS-108 | 2-Ethyl-1,3-hexanediol | ethyl-1,3-propanediol |
| Example 1 | 10 | 0 | 29 | 0 | 0 | 39 | 20 | 2 | 0 | 0.1 |
| Example 2 | 20 | 0 | 29 | 0 | 0 | 49 | 10 | 2 | 0 | 0 |
| Example 3 | 29 | 0 | 10 | 0 | 0 | 39 | 10 | 0.5 | 0.2 | 0.1 |
| Example 4 | 0 | 30 | 11 | 0 | 0 | 41 | 10 | 0.5 | 0.2 | 0.2 |
| Example 5 | 20 | 0 | 0 | 29 | 0 | 49 | 10 | 0.5 | 0.2 | 0.2 |
| Example 6 | 20 | 0 | 0 | 0 | 29 | 49 | 10 | 0.5 | 0.2 | 0.2 |
| Comparative Example 1 | 0 | 0 | 29 | 0 | 0 | 29 | 20 | 0 | 1 | 0 |
| Comparative Example 2 | 0 | 0 | 40 | 0 | 0 | 40 | 20 | 0.5 | 0.2 | 0 |
| Comparative Example 3 | 5 | 0 | 10 | 0 | 0 | 16 | 10 | 0.5 | 0.2 | 0.2 |
| Comparative Example 4 | 40 | 0 | 0 | 0 | 0 | 40 | 20 | 0.5 | 0 | 0.2 |

TABLE 1-2

| | Pre-treatment liquid composition (%) | | | |
|---|---|---|---|---|
| | Foam suppressing agent 2,4,7,9-tetramethyl-4,7-decanediol | Antiseptic and fungicide Sodium compound of 1,2-benzisothiazolin-3-one | Rust inhibitor 1,2,3-Benzotriazole | Water |
| Example 1 | 0 | 0.1 | 0.05 | balance |
| Example 2 | 0.01 | 0.1 | 0.05 | |
| Example 3 | 0.01 | 0.1 | 0.05 | |
| Example 4 | 0.05 | 0.1 | 0.05 | |
| Example 5 | 0.05 | 0.1 | 0.05 | |
| Example 6 | 0.05 | 0.1 | 0.05 | |
| Comparative Example 1 | 0.01 | 0.1 | 0.05 | |
| Comparative Example 2 | 0 | 0.1 | 0.05 | |
| Comparative Example 3 | 0.05 | 0.1 | 0.05 | |
| Comparative Example 4 | 0.01 | 0.1 | 0.05 | |

Compositions of the pre-treatment liquids in Table 1-1 and Table 1-2 are explained below.

—Cationic Polymer—

"DK6810" is a water-soluble cationic polymer manufactured by Seiko PMC Corporation, and it is a copolymer of alkylamine and epichlorohydrin.

"SC-506" is a water-soluble cationic polymer manufactured by HYMO Co., Ltd., and it is a copolymer of quaternary alkylamine and epichlorohydrin.

—Ammonium Salt of Organic Acid—

As an ammonium salt of an organic acid, an ammonium lactate salt, an ammonium malate salt and an ammonium citrate salt were used.

As the ammonium lactate salt, a product manufactured by Musashino Chemical Laboratory, Ltd. was used.

As the ammonium malate salt, a product obtained by neutralizing malic acid manufactured by Fuso Chemical Co., Ltd. with an addition of aqueous ammonia manufactured by Tokyo Chemical Industry Co., Ltd. was used.

As the ammonium citrate salt, a product obtained by neutralizing citric acid manufactured by Fuso Chemical Co., Ltd. with an addition of aqueous ammonia manufactured by Tokyo Chemical Industry Co., Ltd.

—Other Components—

As other components of the pre-treatment liquids, the following components were included: 5% by mass, 10% by mass or 20% by mass of 3-methyl-1,3-butanediol as a water-soluble organic solvent; 0% by mass, 0.5% by mass or 2% by mass of a nonionic surfactant EMULGEN LS-106, manufactured by Kao Corporation, as a surfactant; 0% by mass, 0.2% by mass or 1% by mass of 2-ethyl-1,3-hexanediol as a penetrating agent; 0% by mass, 0.1% by mass or 0.2% by mass of 2-amino-2-ethyl-1,3-propanediol as a pH adjuster; 0% by mass, 0.01% by mass or 0.05% by mass of 2,4,7,9-tetramethyl-4,7-decanediol as a foam suppressing agent; 0.1% by mass of sodium compound of 1,2-benzisothiazolin-3-one as an antiseptic and fungicide; 0.05% by mass of 1,2,3-benzotriazole as a rust inhibitor; and water as a balance.

TABLE 2

|  | Image quality | Granularity |
|---|---|---|
| Example 1 | B | 0.642 |
| Example 2 | A | 0.478 |
| Example 3 | B | 0.667 |
| Example 4 | A | 0.402 |
| Example 5 | A | 0.455 |
| Example 6 | A | 0.445 |
| Comparative Example 1 | D | 1.169 |
| Comparative Example 2 | D | 1.050 |
| Comparative Example 3 | D | 1.335 |
| Comparative Example 4 | D | 1.000 |

From the results in Table 2, it was found that degradation of granularity due to an effect of drying was suppressed in Examples 1 to 6, where the pre-treatment liquid was applied on the recording medium with the coating layer and then the pre-treatment liquid is dried. On the other hand, it was found that degradation of granularity was proceeding due to the effect of drying in Comparative Examples 1 to 6.

It was also found that the drying step carried out after the application of the pre-treatment liquid in Examples 1 to 6 avoids contamination on rollers or members of the printing apparatus and enables continuous image formation.

Aspects of the present invention are as follows.

<1> An image forming method, including:
a pre-treatment liquid application step for applying a pre-treatment liquid on a recording medium including a substrate and a coating layer disposed at least on one surface of the substrate, wherein the pre-treatment liquid is applied on a surface of the recording medium with the coating layer;
a drying step for drying the recording medium on which the pre-treatment liquid has been applied; and
an image forming step for forming an image on the recording medium after drying by discharging a water-based ink by inkjet method,
wherein the pre-treatment liquid includes a water-soluble cationic polymer, an ammonium salt of an organic acid and water, and
wherein the water-based ink includes water and negatively charged colored particles including a colorant.

<2> The image forming method according to <1>, wherein a content of the water-soluble cationic polymer in the pre-treatment liquid is 10% by mass to 70% by mass, and a content of the ammonium salt of an organic acid in the pre-treatment liquid is 1% by mass to 40% by mass.

<3> The image forming method according to <2>, wherein a total content of the content of the water-soluble cationic polymer in the pre-treatment liquid and the content of the ammonium salt of an organic acid in the pre-treatment liquid is 30% by mass or greater.

<4> The image forming method according to any one of <1> to <3>, wherein the water-soluble cationic polymer is a copolymer including an amine monomer and epihalohydrin.

<5> The image forming method according to any one of <1> to <4>, wherein the ammonium salt of an organic acid is ammonium malate, ammonium citrate or ammonium lactate, or any combination thereof.

<6> The image forming method according to <5>, wherein the ammonium salt of an organic acid is ammonium lactate.

<7> The image forming method according to any one of <1> to <6>, wherein the pre-treatment liquid includes a nonionic surfactant.

<8> The image forming method according to any one of <1> to <7>, wherein a wet coating amount of the pre-treatment liquid on the recording medium is 0.1 g/m² to 10.0 g/m².

<9> The image forming method according to any one of <1> to <8>, wherein a drying temperature in the drying step is 80° C. to 100° C.

<10> An image forming apparatus, including:
a pre-treatment liquid applying unit configured to apply a pre-treatment liquid on a recording medium including a substrate and a coating layer disposed at least on one surface of the substrate, wherein the pre-treatment liquid is applied on a surface of the recording medium with the coating layer,
a drying unit configured to dry the recording medium on which the pre-treatment liquid has been applied, and
an image forming unit configured to form an image on the recording medium after drying by discharging a water-based ink by inkjet method,
wherein the pre-treatment liquid includes a water-soluble cationic polymer, an ammonium salt of an organic acid and water, and
wherein the water-based ink includes water and negatively charged colored particles including a colorant.

<11> A recorded matter, including an image recorded by the image forming method according to any one of <1> to <9>.

REFERENCE SIGNS LIST

101 Recording medium before printing
102 Pre-treatment liquid applying unit
103 Drying unit
104 Printing unit
105 Recording medium after printing

The invention claimed is:
1. An image forming method, comprising:
applying a pre-treatment liquid on a recording medium comprising a substrate and a coating layer disposed at least on one surface of the substrate, wherein the pre-treatment liquid is applied on a surface of the recording medium with the coating layer;
drying the recording medium on which the pre-treatment liquid has been applied; and
forming an image on the recording medium after drying by discharging a water-based ink by inkjet method,
wherein the pre-treatment liquid comprises water, a water-soluble cationic polymer, an ammonium salt of an organic acid in an amount of 10% by mass to 40% by mass and selected from the group consisting of ammonium lactate, ammonium propionate, ammonium oxalate, ammonium tartrate, ammonium succinate (diammonium succinate), diammonium malonate, ammonium malate, ammonium citrate, diammonium hydrogen citrate, triammonium citrate and ammonium L-glutamate such that the water-soluble cationic polymer and the ammonium salt of the organic acid are present in a total amount of 40% by mass to 70% by mass, and
wherein the water-based ink comprises water and negatively charged colored particles including a colorant.

2. The image forming method according to claim 1, wherein the water-soluble cationic polymer is a copolymer including an amine monomer and epihalohydrin.

3. The image forming method according to claim 1, wherein the ammonium salt of an organic acid is ammonium malate, ammonium citrate or ammonium lactate, or any combination thereof.

4. The image forming method according to claim 3, wherein the ammonium salt of an organic acid is ammonium lactate.

5. The image forming method according to claim 1, wherein the pre-treatment liquid comprises a nonionic surfactant.

6. The image forming method according to claim 1, wherein a wet coating amount of the pre-treatment liquid on the recording medium is 0.1 g/m$^2$ to 10.0 g/m$^2$.

7. The image forming method according to claim 1, wherein a drying temperature in drying is 80° C. to 100° C.

8. The image forming method according to claim 1, wherein the water-soluble cationic polymer is present in the pre-treatment liquid in an amount of 20% by mass to 60% by mass.

9. The image forming method according to claim 8, wherein the ammonium salt of an organic acid is present in the pre-treatment liquid in an amount of 10% by mass to 30% by mass.

10. The image forming method according to claim 1, wherein the ammonium salt of an organic acid is present in the pre-treatment liquid in an amount of 10% by mass to 30% by mass.

11. The image forming method according to claim 1, wherein the water-soluble cationic polymer and the ammonium salt of the organic acid are present in a total amount of at least 40% by mass to 60% by mass.

12. The image forming method according to claim 9, wherein the water-soluble cationic polymer is a copolymer including an amine monomer and epihalohydrin and the ammonium salt of an organic acid is ammonium malate, ammonium citrate or ammonium lactate, or any combination thereof.

13. The image forming method according to claim 11, wherein the water-soluble cationic polymer is a copolymer including an amine monomer and epihalohydrin and the ammonium salt of an organic acid is ammonium malate, ammonium citrate or ammonium lactate, or any combination thereof.

* * * * *